United States

Larson, III

[11] 3,881,805
[45] May 6, 1975

[54] ACOUSTIC TERMINATIONS FOR ACOUSTICALLY TUNED OPTICAL FILTERS

[75] Inventor: John D. Larson, III, Palo Alto, Calif.

[73] Assignee: Hewlett-Packard Company, Palo Alto, Calif.

[22] Filed: Jan. 18, 1974

[21] Appl. No.: 434,530

[52] U.S. Cl. ............... 350/149; 350/161; 181/33 A
[51] Int. Cl. .............................................. G02f 1/24
[58] Field of Search .......... 350/149, 161; 181/33 A, 181/33 B; 340/8 R

[56] References Cited
UNITED STATES PATENTS 3,614,201   10/1971   Biazzo et al. .................. 350/161 X
3,790,898   2/1974    Gudmundsen et al. ......... 350/161 X Primary Examiner—Ronald L. Wibert
Assistant Examiner—Paul K. Godwin
Attorney, Agent, or Firm—Ronald E. Grubman

[57] ABSTRACT

An acoustic absorber for use in conjunction with an electronically tunable acousto-optic filter is provided. The absorber consists of a mass of acoustic absorbing material such as a lead/gold alloy or a tin/lead alloy, which is affixed to one end of a birefringent crystal used in the construction of the acousto-optic filter. By using an acoustic terminator according to the present invention, acoustic standing waves in the filter arising from internal acoustic reflections may be greatly reduced. This reduction of acoustic standing waves in the filter increases the stability of the optical output of the filter.

3 Claims, 1 Drawing Figure

ACOUSTIC TERMINATIONS FOR ACOUSTICALLY TUNED OPTICAL FILTERS

BACKGROUND AND SUMMARY OF THE INVENTION

It is known to use an optically anisotropic medium such as a photoelastic birefringent crystal in the construction of an electronically tunable acousto-optic filter. An example of such an acousto-optic filter is disclosed in an article entitled "Acousto-Optic Tunable Filter" appearing in the *Journal of the Optical Society of America*, Vol. 59, No. 6 of June 1969, pages 744–747. Filters of the type described in the referenced article operate by collinearly defracting an input light beam of a first polarization on an acoustic wave in the anisotropic medium, to shift the polarization of the polarized input light at a selected bandpass optical frequency from the first polarization to the second orthogonal polarization. The defracted light is then polarization analyzed to separate the light of the second polarization from light of the first polarization. By varying the frequency of the acoustic wave in the anisotropic medium, the optical bandpass of the filter may be electronically tuned.

It has been a difficulty in prior art acousto-optic filters that the acoustic waves on which the light is diffracted are internally reflected from both ends of the birefringent crystal. This reflection gives rise to acoustic standing waves in the crystal, which in turn produce periodic fluctuations in the intensity of the output light as a function of frequency of the acoustic wave. The resulting periodic variations in the optical output are highly temperature dependent, so that the optical output of the filter will be very unstable with temperature if acoustic standing waves are present in the filter.

The present invention reduces undesirable acoustic resonances in an acousto-optic filter by providing an acoustic absorber which is bonded to the acoustically tuned filter near one end. According to a preferred embodiment of the invention, the absorber consists of a mass of material which is a combination of lead and gold. Interposed between the lead/gold composition and the filter are several protective layers which may be, e.g., of gold and nickel respectively. An adhesive layer of a metal such as chrome is used to bond the absorber to the exterior of the birefringent crystal. In accordance with another embodiment of the invention, the absorber material consists of a tin/lead combination.

DETAILED DESCRIPTION OF THE INVENTION

Figure 1:
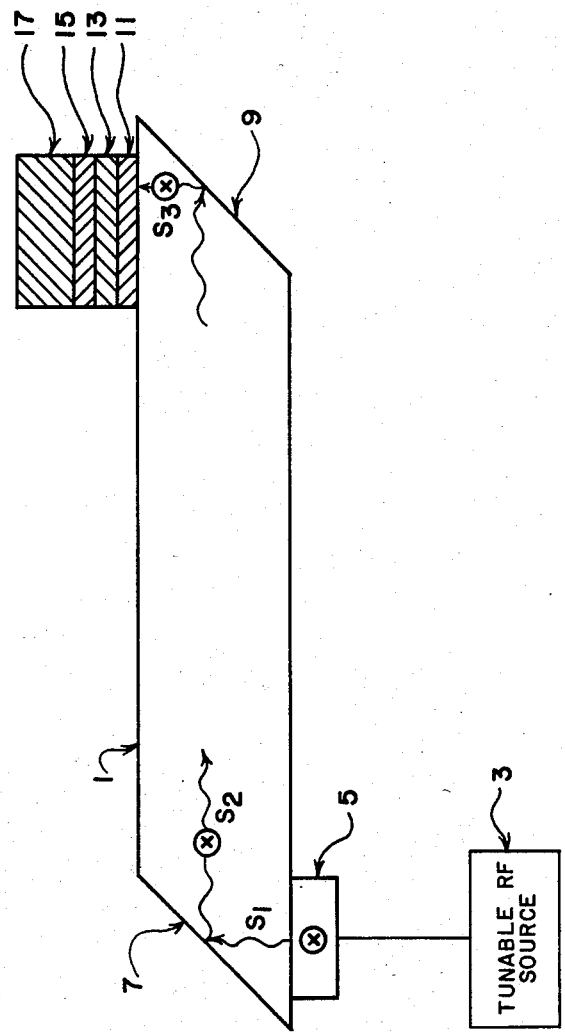
FIG. 1 illustrates an acoustic termination device affixed to an acousto-optic filter.

In FIG. 1 there is shown an optically anisotropic medium 1 which may be, e.g. a photoelastic birefringent crystal of $LiNbO_3$, $PbMoO_4$, $CaMoO_4$ or quartz. The acoustic absorber of the present invention is most effective when used in conjunction with materials having an acoustic impedance to acoustic shear waves in the range 10.5 to 12.5 $\times 10^5$ gms/cm² sec. Of the above listed materials, $CaMoO_4$ and quartz fall in this category and are thus particularly well suited for use in connection with the present invention. A tunable RF source 3 generates an electromagnetic signal which is coupled to crystal 1 through an acoustic transducer 5 which is intimately mounted on the surface of crystal 1. Acoustic transducer 5 excites a shear acoustic wave $S_1$ whose polarization is directed into the plane of the drawing as indicated by the circled X. Acoustic wave $S_1$ is directed against the inside surface of a face 7 of crystal 1, from which it is reflected into an acoustic wave $S_2$ propagating longitudinally down the crystal. In operation, the acoustic wave $S_2$ propagating down the crystal interacts with an optical beam (not shown) which has been directed into the crystal to rotate the optical polarization in a certain band of optical frequencies depending on the acoustic frequency. By utilizing an output polarizer to polarization analyze the light emerging from the crystal, light within the selected band of optical frequencies can be selectively passed, so that the device functions as an optical bandpass filter. The optical bandpass of the filter is electronically tuned by varying the frequency of the acoustic wave by means of tunable RF source 3.

As indicated in FIG. 1, acoustic wave $S_2$ propagates to the face 9 of crystal 1 and is there reflected into an acoustic wave $S_3$. In the absence of an acoustic terminator portions of acoustic wave $S_3$ would be scattered from the interior of the surface of crystal 1 back through the crystal, thereby interacting with acoustic wave $S_2$ to set up undesired acoustic standing waves in the crystal.

In accordance with a preferred embodiment of the present invention, an acoustic termination device is provided which inhibits the formation of acoustic standing waves in the filter. The acoustic terminator consists of various layers of different materials affixed to the exterior of crystal 1 near face 9. First, a thin layer 11 of a material which adheres well to the practicular crystal material of crystal 1 is metallized onto the crystal surface. In practice, the crystal surface should first be polished to an optical quality finish to insure good adhesion of the metallized layer. Adhesive layer 11 may preferably be a chromium layer of thickness 50–100 A. Other adhesive materials such as Mo and Ti are also suitable, but in every case the layer must be sufficiently thin to be essentially transparent to the acoustic waves. A protective layer 13 is then preferably metallized onto adhesive layer 11. Protective layer 13 may be of nickel with thickness about 2,000–3,000 A. If layer 13 is too thick, it can affect the performance of the absorber, while if the layer is too thin it might not sufficiently protect the adhesive layer from possible erosion by the materials to be layered above the nickel. To prevent nickel layer 13 from oxidizing prior to the application of the acoustic terminating material, another protective layer 15 which may be, e.g., of gold about 2,000 A thick may be applied to nickel layer 11.

At this point, the device is ready for the application of an acoustic terminating mass 17. In accordance with a preferred embodiment of the invention, terminating mass 17 consists of a lead/gold solder alloy preferably having a ratio by weight of 84% lead to 16% gold. Other Pb/Au compositions varying from 50/50 to substantially pure lead will also provide acoustic termination. Suitable thicknesses for terminating mass 17 are in the range 0.02–0.10 cm. In preparation for receiving the acoustic termination alloy, the entire crystal is slowly heated to a temperature of about 5° to 10° C. above the melting point of the particular alloy to be used for terminating mass 17. If the Pb/Au – 84/16 material is used, the quartz crystal should be heated to about 220°. A suitable flux, such as a rosin-alcohol flux is applied to gold layer 15, followed by a preform of the Pb/Au termination material. After the termination alloy melts, the entire crystal is allowed to cool at a slow rate, for example at a rate of 1° C. per minute, in order to allow a well-oriented alloy structure to form. It has been found that slow cooling materially improves the high frequency performance of the completed termination device. In devices which have been built according to the above-described preferred embodiment of the invention, acoustic reflection coefficients well in excess of 20 db over a frequency range of 30–300 MHz have been observed.

In accordance with another embodiment of the invention, the Pb/Au terminating layer is replaced by a layer of similar thickness constructed of a tin/lead mixture of nominal values Sn/Pb = 60/40 percent by weight. Other compositions in the range 80/20 to 20/80 will also work effectively as a terminator, but the 60/40 composition is preferred. If the tin/lead composition is used, the quartz crystal should be heated to 180° C. prior to the application of the termination alloy. The rest of the construction of the device is identical to that described above in connection with the Pb/Au terminating alloy.

I claim:

1. An acoustic terminator for an acousto-optic filter comprising:
   a metallized adhesive layer on the surface of the filter; and
   a mass of lead/gold alloy on the adhesive layer, the alloy having a composition by weight of lead to gold in the range 50/50 to 100/0.

2. An acoustic terminator as in claim 1 including a metallized protective layer interposed between the adhesive layer and the lead/gold alloy.

3. An acoustic terminator as in claim 2 wherein the metallized adhesive layer is of chromium and the metallized protective layer is of nickel.

* * * * *